3,014,966
CATALYTIC HYDROGENATION OF PHENYL-ALKYL-β-AMINES
Morris Freifelder and George R. Stone, Waukegan, Ill., assignors to Abbott Laboratories, Chicago, Ill., a corporation of Illinois
No Drawing. Filed Jan. 29, 1958, Ser. No. 711,785
4 Claims. (Cl. 260—563)

This invention relates to a new process for the preparation of cyclohexylalkylamines and also embraces new compounds produced therefrom. The cyclohexylalkyl amines which are produced by the process of the present invention are represented by the formula

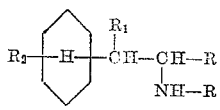

where R=lower alkyl group having 1–6 carbon atoms or H, $R_1$=OH or H, $R_2$=lower alkyl group having 1–6 atoms or H.

More particularly, the invention relates to a process of directly hydrogenating phenylalkylamines to cyclohexylalkylamines where the amino group is β to the alkyl chain. Heretofore, Zenitz, Macks & Moore (J.A.C.S., 69, 1117) reduced a number of amines in glacial acetic acid with platinum oxide using an excessive amount of the catalyst. They found it necessary to make additions of fresh catalyst in order to induce complete reduction. Zenitz et al (J.A.C.S., volume 69, page 1118, Table 1, footnote) also noted that upon hydrogenation of phenylalkylamines with a platinum catalyst, a reversal in rotation was effected. Other difficulties encountered in this process were noted by Metayer, Bull. Soc. Chem., 1952, page 276. Thus, when a primary or secondary amino group is beta to the phenyl ring, high temperatures must be used which results in objectionable hydrolysis and cracking.

It is therefore an object of this invention to provide a means of obtaining high yields of cyclohexylalkyl-β-amines by direct hydrogenation of aralkylamines at moderate temperature and pressure.

It is also an object of this invention to provide a means of directly hydrogenating aralkylamines to cyclohexylalkyl-β-amines without change of rotation.

A further object of this invention is to provide a method of hydrogenating aralkyl-β-amines without the use of large quantities of catalysts.

A still further object of this invention is to provide for hydrogenation of aralkyl-β-amines without undesirable hydrolysis or cracking.

Other objects of the invention will be apparent from the detailed description and claims to follow.

The foregoing and other objects and advantages are accomplished when an aralkyl-β-amine or substituted aralkyl-β-amine is reduced with or without a solvent in the presence of ruthenium dioxide, or ruthenium or on a carrier such as ruthenium on alumina, at a temperature of about 60° to 160° C. and at a pressure of from about 1000 to 1300 pounds p.s.i.

The reaction generally is completed in less than one hour with consequent high yields. Conditions are such that a continuous process can be devised. In a likely manner, salts of the aralkylamines may be employed by the described procedure.

The cyclohexylalkylamines, produced by this process, show pharmacological activity as central nervous stimulants and vasoconstrictors. An example of such a cyclohexylalkylamine is β - cyclohexylisopropylmethylamine which is known in the trade as Benzedrex.

Certain of the aralkylamine compounds which are produced by this process are new, including the compounds 1-N-methyl-1-hydroxyisopropylamine and β(p-isopropyl cyclohexyl)-ethylamine, N-butyl-1-phenylisopropylamine, and N - butyl - 1 - cyclohexylisopropylamine. The hydrochloride salts of these compounds are also new compounds. All of these compounds, like those of the general aralkylamine class, can be used in the medical arts as central nervous stimulants and vasoconstrictors.

The following specific examples are set forth for the purpose of illustrating the invention and should not be construed to limit the invention to the precise ingredients and proportions shown.

EXAMPLE I

*dl-N-methyl-1-cyclohexylisopropylamine*

74.6 g. (0.5 mole) dl-N-methyl-1-phenylisopropylamine is placed in a one-liter autoclave with 1.5 g. ruthenium dioxide catalyst and the mixture hydrogenated under pressure of 1175 pounds p.s.i. at 90° C. When reduction is complete (which generally takes about 10 minutes), the material is filtered from the catalyst and distilled. The product dl-N-methyl-1-cyclohexylisopropylamine has a B.P.=74–76° C./8 mm., and refractive index of $n^{25}D$=1.4570. Yield=69.9 g. (90%). The hydrochloride salt has a M.P. of 127–128° C.

EXAMPLE II

*dl-N-methyl-1-cyclohexylisopropylamine*

74.6 g. (0.5 mole) dl-N-methyl-1-phenylisopropylamine is placed in a one-liter autoclave with 23 g. 5% ruthenium on alumina and the mixture hydrogenated (1.5 hrs.) under 1250 pounds p.s.i. at 90° C. The material is then decanted from under the same conditions. After reduction is complete, the mixture is filtered and washed with ethanol and the filtrate concentrated. The residue is then distilled from which dl-N-methyl-1-cyclohexylisopropylamine is recovered in a yield of 136.2 g. (88%). The product dl-N-methyl-1-cyclohexylisopropylamine has a B.P. 93–96° C./20 mm. The hydrochloride salt has a M.P. of 125–6° C.

In a similar experiment using 1% ruthenium dioxide in place of ruthenium on alumina as the catalyst, reduction is complete in 10 minutes. A 90% yield is obtained.

EXAMPLE III

*d-N-methyl-1-cyclohexylisopropylamine* d-N-methyl-1-phenylisopropylamine is hydrogenated as in Example I is less than one hour. The d-N-methyl-1-cyclohexylisopropylamine boils at 78° C./8 mm., and has a refractive index of $n^{25}D$=1.4560. Yield=78%. The hydrochloride salt has a M.P. of 137–9° (described in literature) 138–9° and a specific rotation=+14.28°.

EXAMPLE IV

*1-N-methyl-1-cyclohexylisopropylamine*

In the same manner as in Example III, the laevo-rotary compound is prepared by hydrogenation of N-methyl-1-phenylisopropylamine in a yield of 81.5%. The product 1-N-methyl-1-cyclohexylisopropylamine boils at 80° C./10 mm., and has a refractive index of $n^{21}D$=1.4560. The hydrochloride salt melts at 138–9° and has a specific rotation=−14°.

EXAMPLE V

*dl-N-methyl-1-cyclohexylisopropylamine hydrochloride*

14.9 g. (0.08 mole) dl-N-methyl-1-phenylisopropylamine hydrochloride in 75 cc. absolute alcohol is hydrogenated with 0.3 g. ruthenium dioxide catalyst as in Example I. When reduction is complete, the solution is filtered and concentrated and 13.5 g. (88%) of the hydrochloride salt of dl-N-methyl-1-cyclohexylisopropylamine is obtained and melts at 126° C.

EXAMPLE VI d-1-cyclohexylisopropylamine 67.5 g. (0.5 mole) d-1-phenylisopropylamine is hydrogenated with ruthenium catalyst as in Example I and a 66% yield of d-1-cyclohexylisopropylamine was obtained which boils at 82–85° C./15 mm., and has a refractive index of $n^{25}D=1.4578$. The hydrochloride salt melts at 190–192° C.

EXAMPLE VII

β-Cyclohexylethylamine 60.5 g. (0.5 mole) of β-phenethylamine is hydrogenated as in Example I. Yield of the product β-cyclohexylethylamine is 83%, which boils at 71–83° C./13 mm., and has a refractive index of $n^{25}D=1.4626$.

EXAMPLE VIII

1-N-methyl-1-cyclohexyl-1-hydroxyisopropylamine 82.6 g. (0.5 mole) of 1-N-methyl-1-phenyl-1-hydroxyisopropylamine (1-ephedrine) is hydrogenated as in Example I. A 89% yield of the product 1-N-methyl-1-cyclohexyl-1-hydroxyisopropylamine is obtained which boils at 114–117° C./8 mm. The hydrochloride salt melts at 200–201° C. and has a specific rotation= —11.3°.

Analysis—Calcd. For $C_{10}H_{21}NO \cdot HCl$: C, 57.81%; H, 10.68%; N, 6.74. Found: C, 58.08%; H, 10.73%; N, 6.68%.

EXAMPLE IX

β(p-Isopropyl cyclohexyl)-ethylamine 27.5 g. (0.168 mole) of β(p-isopropyl phenyl)-ethylamine is hydrogenated as in Example I. A 70% yield of product β(p-isopropyl cyclohexyl)-ethylamine is obtained which boils at 101° C./5 mm., and has a refractive index of $n^{25}D=1.4743$. Analysis Calcd. For $C_{11}H_{23}N$: C, 78.03%; H, 13.69%. Found: C, 77.93%; H, 13.12%. The hydrochloride salt melts at 225–227° C.

EXAMPLE X

N-butyl-1-cyclohexylisopropylamine 68.6 g. phenyl acetone and 43.8 g. butylamine are mixed with 10 cc. alcohol and hydrogenated in the presence of 1.4 g. platinum oxide at room temperature under 48 pounds p.s.i. After reduction is complete, the mixture is distilled. A yield of 79 g. of N-butyl-1-cyclohexylisopropylamine is obtained which boils at 130–137° C./20 mm., and has a refractive index of $n^{25}D=1.4922$. Analysis Calcd. For $C_{13}H_{31}N$: C, 81.61; H, 11.07; N, 7.32. Found: C, 81.25; H, 10.95; N, 7.68. The hydrochloride M.P. is 172°. Analysis Calcd. For $C_{13}H_{21}N \cdot NCl$: C, 68.55; H, 29.74; N, 6.15; Cl, 15.56. Analysis found: C, 68.91; H, 29.81; N, 6.10; Cl, 15.55.

40.2 g. of N-butyl-1-phenylisopropylamine as above produced is hydrogenated in the presence of 0.8 g. ruthenium dioxide at 90° and 1000 p.s.i in the same manner as in Example I. Yield of 30.4 g. (73.6%) of N-butyl-1-cyclohexylisopropylamine is obtained after distillation, which has a boiling point of 130–133.5° (20 mm.), and a refractive index of $n^{25}D=1.454$. Analysis Calcd. For $C_{13}H_{27}N$. C, 79.11; H, 13.79; N, 7.10. Analysis Found: C, 79.41; H, 14.07; N, 7.22. Hydrochloride salt, M.P. 127–8°. Analysis Calcd. For $C_{13}H_{27}N \cdot HCl$. C, 66.77; H, 12.07; N, 5.99: Analysis Found: C, 66.88; H, 11.88; N, 6.11.

Others may practice the invention in any of the numerous ways which will be suggested by this disclosure to one skilled in the art. All such practice of the invention is considered to be a part hereof provided it falls within the scope of the appended claims.

We claim:

1. A process for preparing cyclohexylalkyl-β-amines represented by the formula

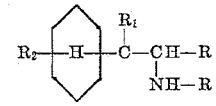

wherein R is selected from the group consisting of hydrogen and lower alkyl having 1–6 carbon atoms; $R_1$ is selected from the group consisting of hydroxy and hydrogen; and $R_2$ is selected from the group consisting of hydrogen and lower alkyl having 1–6 carbon atoms comprising the hydrogenation of the corresponding phenylalkyl-β-amines under a pressure of about 1000 to 1300 pounds p.s.i. at a temperature of about 60° to 160° C. in the presence of a ruthenium catalyst selected from the class consisting of ruthenium dioxide and ruthenium present on a carrier until the reaction is complete, filtering and separating the cyclohexylalkyl-β-amines from the catalyst.

2. A process for preparing cyclohexylalkyl-β-amines represented by the formula

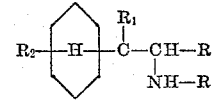

wherein R is selected from the group consisting of hydrogen and lower alkyl having 1–6 carbon atoms; $R_1$ is selected from the group consisting of hydroxy and hydrogen; and $R_2$ is selected from the group consisting of hydrogen and lower alkyl having 1–6 carbon atoms comprising the hydrogenation of the corresponding phenylalkyl-β-amines under a pressure of about 1000 to 1300 pounds p.s.i. at a temperature of about 60° to 160° C. in the presence of about 0.5–5% by weight of ruthenium dioxide catalyst based on the weight of the phenylalkylamine, until the reaction is complete, filtering and distilling the cyclohexylalkyl-β-amine from catalyst.

3. A process of preparing cyclohexylalkyl-β-amines

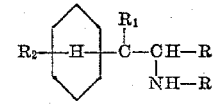

wherein R is selected from the group consisting of hydrogen and lower alkyl having 1–6 carbon atoms; $R_1$ is selected from the group consisting of hydroxy and hydrogen; and $R_2$ is selected from the group consisting of hydrogen and lower alkyl having 1–6 carbon atoms comprising the hydrogenation of the corresponding phenylalkyl-β-amines under a pressure of about 1200 to 1300 pounds p.s.i. at a temperature of about 60° to 160° C. in the presence of about 5% by weight of ruthenium on alumina catalyst based on the weight of the phenylalkyl-β-amine, until the reaction is complete, filtering and distilling the cyclohexylalkyl-β-amines from catalyst.

4. A process for preparing β(p-isopropyl cyclohexyl)-ethylamine which comprises the hydrogenation of β(p-isopropylphenyl)-ethylamine in the presence of about 1% ruthenium dioxide based on the weight of the β(p-isopropylphenyl)-ethylamine at about 1175 pounds p.s.i. at about 90° C. until the reaction is complete, filtering and distilling the β(p-isopropyl cyclohexyl)-ethylamine from the catalyst.

References Cited in the file of this patent
UNITED STATES PATENTS

| | | |
|---|---|---|
| 1,907,820 | Jaeger | May 9, 1933 |
| 2,454,746 | Ullyot | Nov. 23, 1948 |
| 2,482,377 | Shelton et al. | Sept. 20, 1949 |
| 2,586,512 | Burtner et al. | Feb. 19, 1952 |
| 2,606,926 | Kirby | Aug. 12, 1952 |

OTHER REFERENCES

Shiho: Journal of the Chemical Society, Japan, vol. 65, pages 135–40 (1941), cited from Chemical Abstracts, vol. 41, pages 3799–3800 (1947).